United States Patent
Nakazawa

(10) Patent No.: US 10,761,494 B2
(45) Date of Patent: Sep. 1, 2020

(54) POLICY INTRODUCED EFFECT PREDICTION APPARATUS, AND POLICY INTRODUCED EFFECT PREDICTION METHOD

(71) Applicant: FUJITSU LIMITED, Kawasaki-shi, Kanagawa (JP)

(72) Inventor: Katsuhito Nakazawa, Urawa (JP)

(73) Assignee: FUJITSU LIMITED, Kawasaki (JP)

( * ) Notice: Subject to any disclaimer, the term of this patent is extended or adjusted under 35 U.S.C. 154(b) by 330 days.

(21) Appl. No.: 15/841,856

(22) Filed: Dec. 14, 2017

(65) Prior Publication Data

US 2018/0173172 A1 Jun. 21, 2018

(30) Foreign Application Priority Data

Dec. 19, 2016 (JP) ................................. 2016-245532

(51) Int. Cl.
 *G06F 17/18* (2006.01)
 *G05B 13/04* (2006.01)
 (Continued)

(52) U.S. Cl.
 CPC ......... *G05B 13/04* (2013.01); *G06F 16/2477* (2019.01); *G06F 17/18* (2013.01);
 (Continued)

(58) Field of Classification Search
 USPC .............................. 703/2; 705/7.27; 714/26
 See application file for complete search history.

(56) References Cited

U.S. PATENT DOCUMENTS 8,127,298 B2 * 2/2012 Kato ....................... G06F 1/206
                                                    718/104
8,457,802 B1 * 6/2013 Steven ...................... H02J 3/46
                                                    700/291

(Continued)

FOREIGN PATENT DOCUMENTS

| EP | 3065094 | 9/2016 |
|----|---------|--------|
| JP | 2005-332350 | 12/2005 |
| JP | 2013-061698 | 4/2013 |

OTHER PUBLICATIONS

Patent Abstracts of Japan English Abstract for Japanese Patent Application Publication No. 2013-061698, published on Apr. 4, 2013.

(Continued)

*Primary Examiner* — Thai Q Phan
(74) *Attorney, Agent, or Firm* — Staas & Halsey LLP

(57) ABSTRACT

A disclosed policy introduced effect prediction apparatus includes a memory storing a set of instructions of a policy introduced effect prediction program, and processors programed to execute the instructions to perform a policy introduced effect prediction process. The policy introduced effect prediction process includes calculating at least one calculation model based on first difference data calculated based on time series data of an objective variable and second difference data calculated based on time series data of an explanatory variable, calculating a difference amount of the objective variable by inputting a difference amount of the explanatory variable for introducing a policy into the calculated calculation model, and calculating a predicted value of the objective variable in response to introduction of the policy by adding the calculated difference amount of the objective variable to a predicted value of the objective variable in the absence of the introduction of the policy.

9 Claims, 14 Drawing Sheets

(51) Int. Cl.
  *G06F 16/2458* (2019.01)
  *G06Q 50/26* (2012.01)
  *G06Q 10/06* (2012.01)
  *G06Q 10/04* (2012.01)
  *G06N 5/04* (2006.01)

(52) U.S. Cl.
  CPC .......... *G06N 5/043* (2013.01); *G06Q 10/04* (2013.01); *G06Q 10/06* (2013.01); *G06Q 10/063* (2013.01); *G06Q 50/26* (2013.01)

(56) References Cited

U.S. PATENT DOCUMENTS

| | | | | |
|---|---|---|---|---|
| 9,535,563 | B2* | 1/2017 | Hoffberg | G05B 15/02 |
| 9,607,155 | B2* | 3/2017 | Beresnevichiene | G06F 21/577 |
| 2003/0101080 | A1 | 5/2003 | Zizzamia et al. | |
| 2006/0069616 | A1* | 3/2006 | Bau | G06Q 30/02 |
| | | | | 705/14.53 |
| 2007/0143171 | A1* | 6/2007 | Boyd | G06Q 30/06 |
| | | | | 705/306 |
| 2011/0276828 | A1* | 11/2011 | Tamaki | G05B 23/0254 |
| | | | | 714/26 |
| 2014/0039965 | A1* | 2/2014 | Steven | G06Q 10/06315 |
| | | | | 705/7.25 |
| 2014/0172678 | A1* | 6/2014 | Stephens | G06Q 10/0637 |
| | | | | 705/38 |
| 2014/0278294 | A1* | 9/2014 | Yeager | G06F 30/20 |
| | | | | 703/2 |
| 2015/0286969 | A1* | 10/2015 | Warner | G06Q 10/0633 |
| | | | | 705/7.27 |
| 2016/0371408 | A1* | 12/2016 | Nakazawa | G06F 17/18 |
| 2017/0235569 | A1* | 8/2017 | Sturtevant | G06Q 40/12 |
| | | | | 717/102 |

OTHER PUBLICATIONS

Patent Abstracts of Japan English Abstract for Japanese Patent Application Publication No. 2005-332350, published Feb. 12, 2005.
Communication dated Jan. 24, 2018 from the EPO regarding application No. 17207393.4.

* cited by examiner

FIG.2A

| LOCAL GOVERNMENT TIME SERIES DATA (LOCAL GOVERNMENT NAME = aaa) | | | |
|---|---|---|---|
| YEAR | POPULATION | MARRIAGE COUNT | ... |
| 2000 | 186588 | 1033 | ... |
| 2001 | 185931 | 985 | ... |
| 2002 | 185217 | 997 | ... |
| 2003 | 184113 | 893 | ... |
| 2004 | 183271 | 888 | ... |
| 2005 | 182408 | 847 | ... |
| 2006 | 181362 | 867 | ... |
| 2007 | 180121 | 886 | ... |
| 2008 | 178977 | 819 | ... |
| 2009 | 178047 | 791 | ... |
| 2010 | 176945 | 845 | ... |
| 2011 | 176120 | 783 | ... |
| 2012 | 174928 | 779 | ... |
| 2013 | 174477 | 791 | ... |

FIG.2B

| NATIONWIDE TIME SERIES DATA ~220 | | | |
|---|---|---|---|
| YEAR | POPULATION | MARRIAGE COUNT | ... |
| 2000 | ... | ... | ... |
| 2001 | ... | ... | ... |
| 2002 | ... | ... | ... |
| 2003 | ... | ... | ... |
| 2004 | ... | ... | ... |
| 2005 | ... | ... | ... |
| 2006 | ... | ... | ... |
| 2007 | ... | ... | ... |
| 2008 | ... | ... | ... |
| 2009 | ... | ... | ... |
| 2010 | ... | ... | ... |
| 2011 | ... | ... | ... |
| 2012 | ... | ... | ... |
| 2013 | ... | ... | ... |

FIG.7

| | | 700 |
|---|---|---|
| REGRESSION ANALYSIS RESULT DATA | | |
| YEAR | BAU DATA (OBJECTIVE VARIABLE) | BAU DATA (EXPLANATORY VARIABLE) |
| 2014 | ... | ... |
| 2015 | ... | ... |
| 2016 | ... | ... |
| 2017 | ... | ... |
| 2018 | ... | ... |
| 2019 | ... | ... |
| 2020 | ... | ... |
| 2021 | ... | ... |
| ⋮ | ⋮ | ⋮ |
| 2050 | ... | ... |

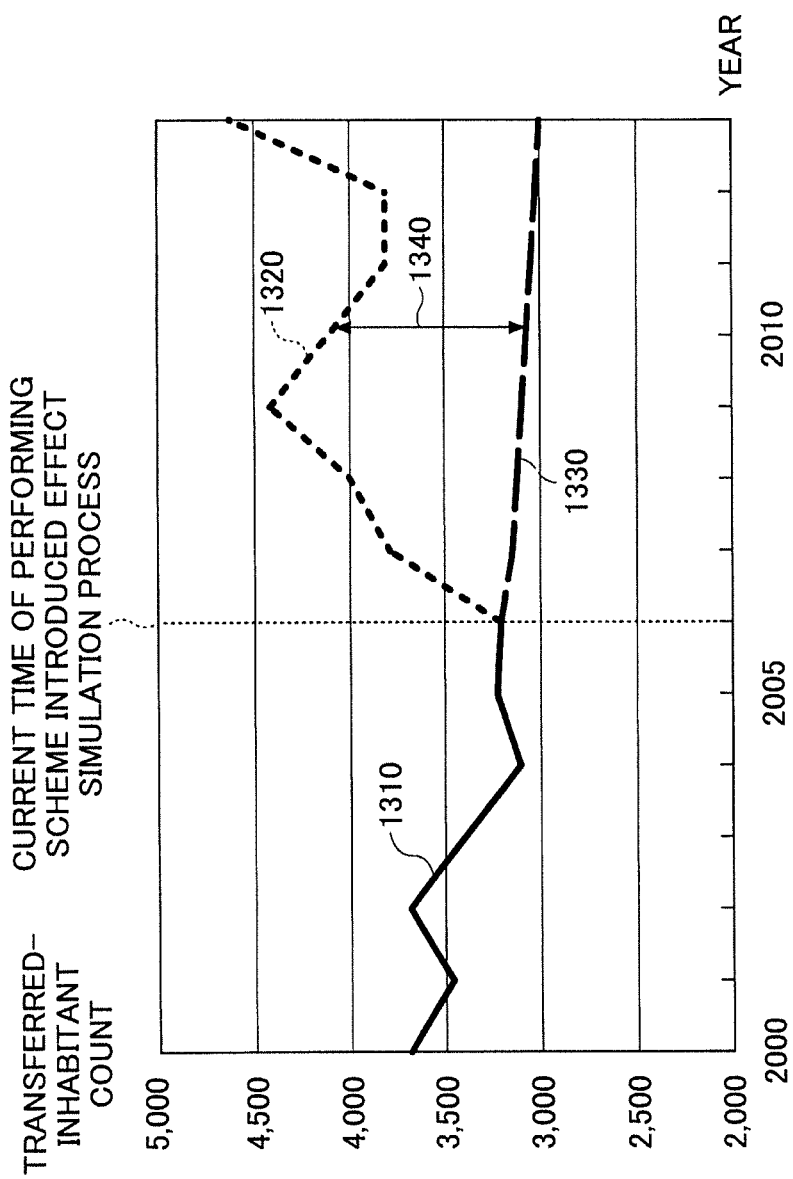

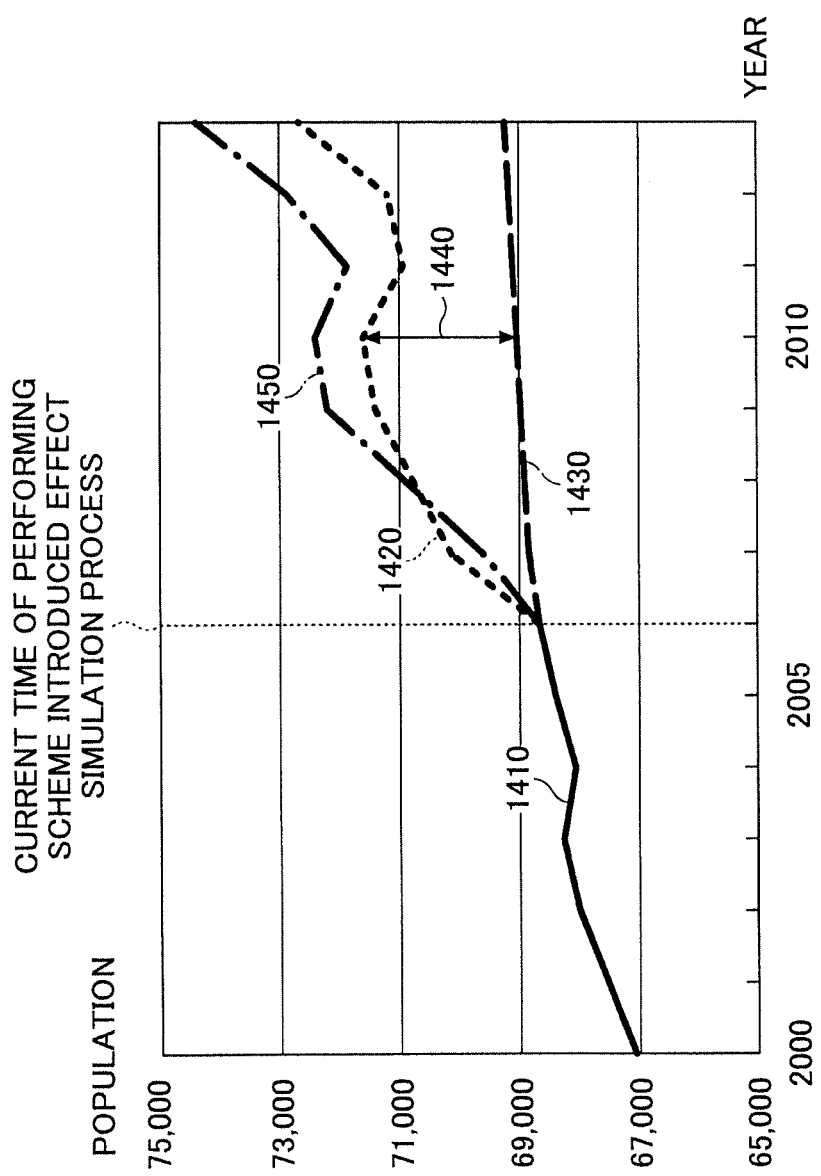

POLICY INTRODUCED EFFECT PREDICTION APPARATUS, AND POLICY INTRODUCED EFFECT PREDICTION METHOD

CROSS-REFERENCE TO RELATED APPLICATIONS

This application is based upon and claims the benefit of priority of the prior Japanese Patent Application No. 2016-245532, filed on Dec. 19, 2016, the entire contents of which are incorporated herein by reference.

FIELD

The embodiments discussed herein relate to a policy introduced effect prediction apparatus, and a policy introduced effect prediction method.

BACKGROUND

Local governments in the cities, wards, towns, and villages are required to formulate effective policies for various social problems (e.g., population decline, low birthrate and aging population, etc.). In planning policies, it is necessary to quantitatively verify the effect of introducing policies without relying on empirical rules, and simulating future prospects has been considered for some time.

In simulating future prospects, one of effective prediction methods may be to calculate a model by regression analysis of the time series data of an objective variable (a variable indicating the effect of introducing a policy) and an explanatory variable (a variable highly related to the objective variable). For example, a regression analysis is conducted using time series population data as an objective variable, and time series the marriage count data as an explanatory variable to calculate a model, and an expected value of an explanatory variable when the policy is introduced (an expected value of the marriage count data when the policy is introduced) is input into the model. Thus, according to the above prediction method, it is possible to calculate the predicted value of the objective variable (population data) as a future prospect and to quantitatively obtain the effect of introducing the policy.

RELATED-ART DOCUMENTS

Patent Documents

Patent Document 1: Japanese Laid-open Patent Publication No. 2013-61698
Patent Document 2: Japanese Laid-open Patent Publication No. 2005-332350

SUMMARY

In certain embodiments, a policy introduced effect prediction apparatus may include a memory storing a set of instructions of a policy introduced effect prediction program; and one or more processors programed to execute the set of instructions to perform a policy introduced effect prediction process. The policy introduced effect prediction process includes calculating at least one calculation model based on first difference data calculated based on time series data of an objective variable and second difference data calculated based on time series data of an explanatory variable; calculating a difference amount of the objective variable by inputting a difference amount of the explanatory variable for introducing a policy into the calculated calculation model; and calculating a predicted value of the objective variable in response to introduction of the policy by adding the calculated difference amount of the objective variable to a predicted value of the objective variable in the absence of the introduction of the policy.

The object and advantages of the subject matter of this application will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF THE DRAWINGS

FIGS. 2A and 2B are diagrams illustrating an example of time series data stored in a time series data storage device;
FIG. 7 is a diagram illustrating a specific process example of a business as usual (BAU) calculator according to the first embodiment;
FIG. 13 is a diagram illustrating a specific process example of an effect calculator according to the second embodiment;
and
FIG. 14 is a diagram illustrating specific process examples of a difference amount calculator and a predicted value calculator according to the second embodiment.

DESCRIPTION OF EMBODIMENTS

Figure 1:
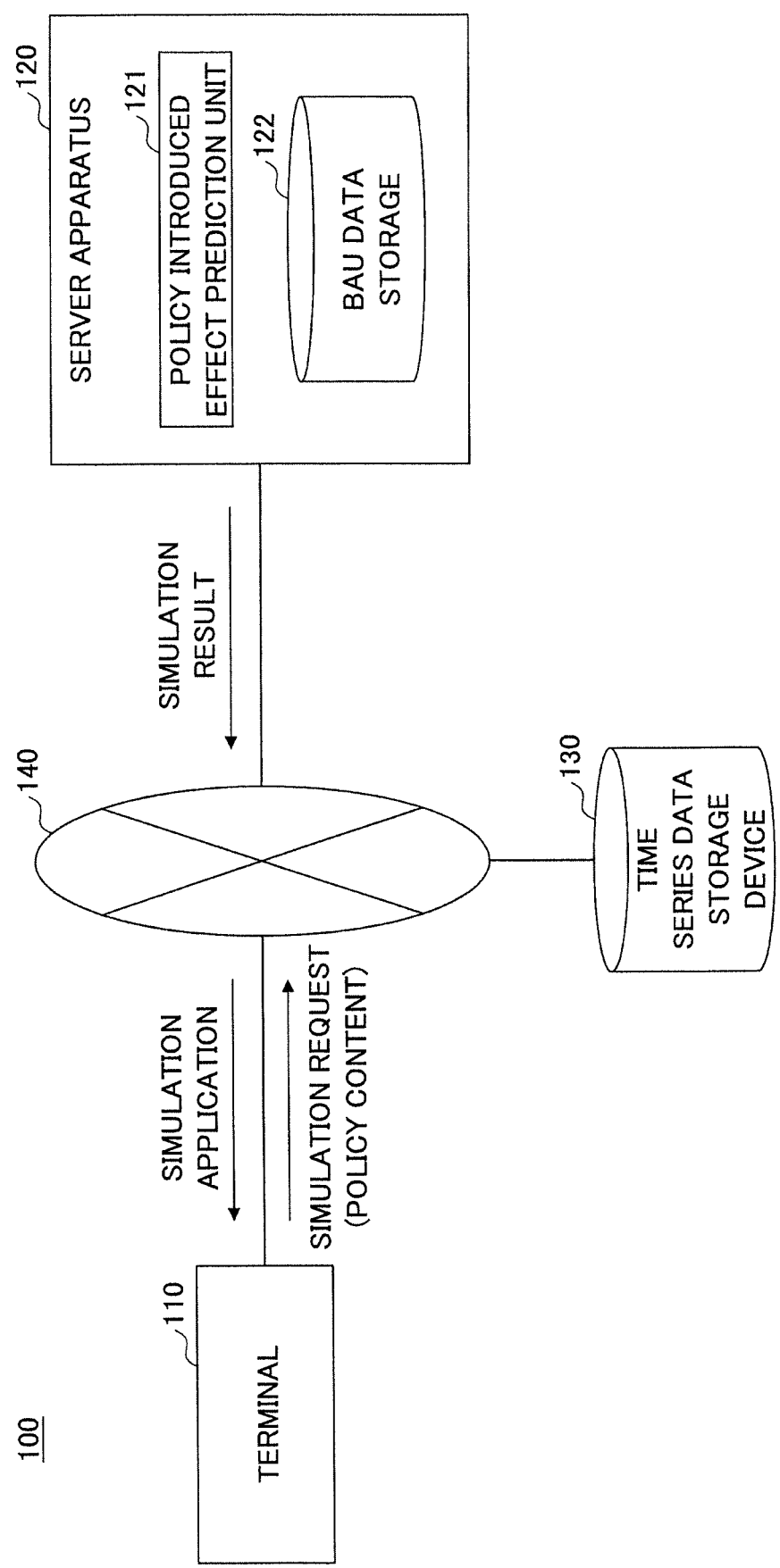
FIG. 1 is a diagram showing an example of a system configuration of a policy introduced effect prediction system.

The model calculated based on the regression analysis as described above may, however, fail to calculate an appropriate predicted value; this is because when explanatory variables having mutually high correlation are included in the model calculation, the predicted value of the objective variable is not stabilized due to the effect of multiple collinearity. Further, since previous time series data are used in calculating the model, changes in social structure due to the introduction of policies are not reflected in the model, and the predicted value of the objective variable to be calculated may result in deviating from reality.

The following illustrates preferred embodiments with reference the accompanying drawings.

The following illustrates embodiments with reference to the accompanying drawings. In the present specification and the drawings, the same reference numerals are assigned to constituent elements having substantially the same functional configurations, and duplicated explanation will be omitted.

First Embodiment

System Configuration of Policy Introduced Effect Prediction System

First, a system configuration of a policy introduced effect prediction system will be described. FIG. 1 is a diagram illustrating an example of a system configuration of a policy introduced effect prediction system.

As illustrated in FIG. 1, a policy introduced effect prediction system 100 includes a terminal 110, a server apparatus 120, and a time series data storage device 130. The devices included in the policy introduced effect prediction system 100 are mutually connected via a network 140.

For example, the terminal 110 may be disposed in a local government to be used by a user who performs a policy formulating job. A Web browser installed in the terminal 110 accesses the server apparatus 120 via the network 140 to make a download request for the simulation application. The simulation application is an application for utilizing a policy introduced effect prediction service provided by the server apparatus 120.

The terminal 110 accesses the time series data storage device 130 via the simulation application transmitted from the server apparatus 120 in response to the download request, and acquires various time series data to be simulated that are managed by the local government. A user who performs a policy formulating job determines a policy content based on the time series data acquired by the terminal 110.

Specifically, the user inputs a local government name, selects an objective variable name (a name of a variable (e.g., "population") indicating the effect of introducing the policy) and an explanatory variable name (a name of a variable having a high relation with the objective variable (e.g., "marriage count")), and inputs the selected objective variable name and explanatory variable name into the simulation application. In addition, the user inputs the expected value of the explanatory variable when a policy is introduced (expected value for the marriage count data when the policy is introduced) to the simulation application.

The terminal 110 transmits a simulation request including a policy content input by the user to the server apparatus 120 via the simulation application and requests execution of the policy introduced effect simulation process. Note that the policy content included in the simulation request includes a name of the local government, an objective variable name, an explanatory variable name, an expected value of an explanatory variable in a case of introducing a policy, and the like, which are input by the user.

Further, the terminal 110 receives and displays the simulation result transmitted from the server apparatus 120 as the policy introduced effect simulation process is executed.

The server apparatus 120 is an example of a policy introduced effect prediction apparatus. The server apparatus 120 is installed with a policy introduced effect prediction program. The server apparatus 120 functions as the policy introduced effect prediction unit 121 by executing the policy introduced effect prediction program.

The policy introduced effect prediction unit 121 transmits a simulation application to the terminal 110 in response to a download request from the terminal 110. In addition, the policy introduced effect prediction unit 121 executes a policy introduced effect simulation process in response to a simulation request from the terminal 110, and transmits the simulation result to the terminal 110.

Note that the policy introduced effect prediction unit 121 stores, in a business as usual (BAU) data storage 122, BAU data (details will be described later) calculated by executing the policy introduced effect simulation process.

The time series data storage device 130 stores various time series data (referred to as "local government time series data") managed for each local government. In addition, the time series data storage device 130 stores each of various time series data compiled nationwide ("nationwide time series data"), which is managed by local governments (e.g., approximately 1700 different municipalities, nationwide).

Illustration of Time Series Data

FIGS. 2A and 2B are diagrams illustrating an example of time series data stored in a time series data storage device. Of these, FIG. 2A is an example of time series data of the local government. The example in FIG. 2A indicates the time series data 210 of the local government with the local government name="aaa".

The time series data 210 of the local government includes "year", "population", "marriage count", and the like as items of information. In the "year", the year when each data was compiled is recorded in the local government with the local government name="aaa". In the "population", population data of each year complied in the local government with local government name="aaa" is recorded. In the "marriage count", data on the marriage count in each year complied by local government with the local government="aaa" is recorded.

The example in FIG. 2A illustrates that the population of the local government with local government name="aaa" in 2000 was 186588, and the marriage count in the same year was 1033. In the following, it is assumed that the population and the marriage count until the year 2013 are recorded in the time series data 210 of the local government (in the first embodiment, the current time is described as 2013).

Note that the information items of the time series data 210 of the local government illustrated in FIG. 2A are merely examples, and other items of information may be included.

Of these, FIG. 2B is an example of nationwide time series data. As illustrated in FIG. 2B, the information items included in the nationwide time series data 220 are the same as the information items included in the time series data 210 of the local government. Accordingly, a detailed description of time series data 220 nationwide is omitted here.

Hardware Configuration of Each Device Included in Policy Introduced Effect Prediction System Next, a hardware configuration of each device (the terminal 110 to the time series data storage device 130) included in the policy introduced effect prediction system 100 will be described. Since the hardware configuration of each of the devices included in the policy introduced effect prediction system 100 is substantially the same, the hardware configuration of the server apparatus 120 will be described as a representative example.

Figure 3:
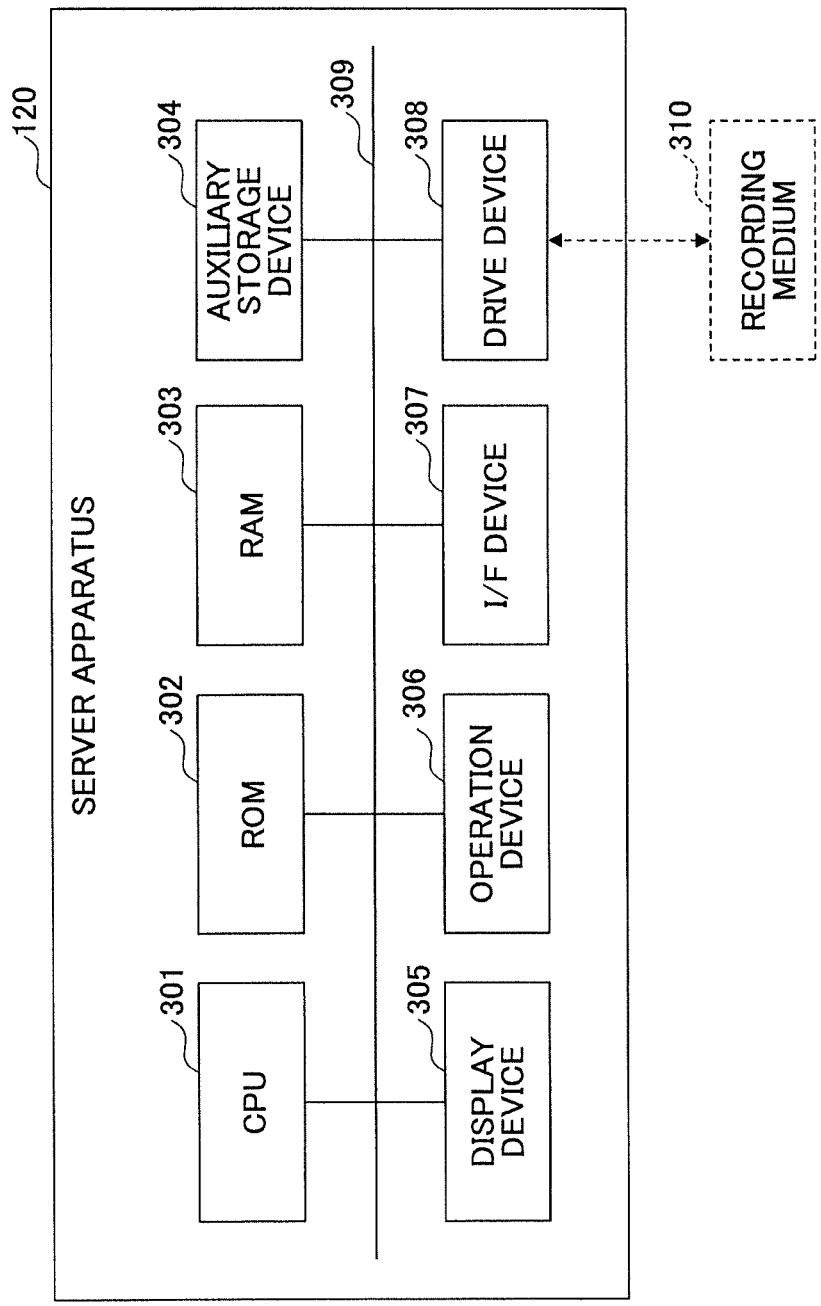
FIG. 3 is a diagram illustrating an example of a hardware configuration of a server apparatus.

FIG. 3 is a diagram illustrating an example of the hardware configuration of a server apparatus. As illustrated in FIG. 3, the server apparatus 120 includes a central processing unit (CPU) 301, a read only memory (ROM) 302, and a random access memory (RAM) 303. The CPU 301, the ROM 302, and the RAM 303 form a so-called computer.

Further, the server apparatus 120 includes an auxiliary storage device 304, a display device 305, an operation device 306, an interface (I/F) device 307, and a drive device 308. Note that the respective units of the server apparatus 120 are mutually connected via a bus 309.

The CPU 301 is a device that executes various programs (e.g., policy introduced effect prediction program etc.) installed in the auxiliary storage device 304. The ROM 302 is a nonvolatile memory. The ROM 302 functions as a main storage device configured to store various programs, data, and the like necessary for the CPU 301 to execute various programs installed in the auxiliary storage device 304. More specifically, the ROM 302 stores a boot program such as basic input/output system (BIOS) or extensible firmware interface (EFI).

The RAM 303 is a volatile memory such as dynamic random access memory (DRAM) or static random access memory (SRAM). The RAM 303 functions as a main storage device configured to provide a work area, in which various programs installed in the auxiliary storage device 304 are loaded upon being executed by the CPU 301.

The auxiliary storage device 304 is configured to store various programs, information generated by execution of various programs, and information used for execution of various programs. The BAU data storage 122 may be implemented in the auxiliary storage device 304.

The display device 305 is configured to display internal state and the like of the server apparatus 120. The operation device 306 is an input device for an administrator of the server apparatus 120 to input various instructions to the server apparatus 120.

The I/F device 307 is a communication device connected to the network 140 and communicating with the terminal 110 and the time series data storage device 130.

The drive device 308 is used for setting the recording medium 310. The recording medium 310 referred to here includes a medium for optically, electrically or magnetically recording information, such as a CD-ROM, a flexible disk, a magneto-optical disk and the like. Alternatively, the recording medium 310 may include a semiconductor memory or the like for electrically recording information, such as a ROM, a flash memory, or the like.

Various programs stored in the auxiliary storage device 304 are installed, for example, when the distributed recording medium 310 is set in the drive device 308, and various programs recorded in the recording medium 310 are read by the drive device 308.

Functional Configuration of Server Apparatus

Figure 4:
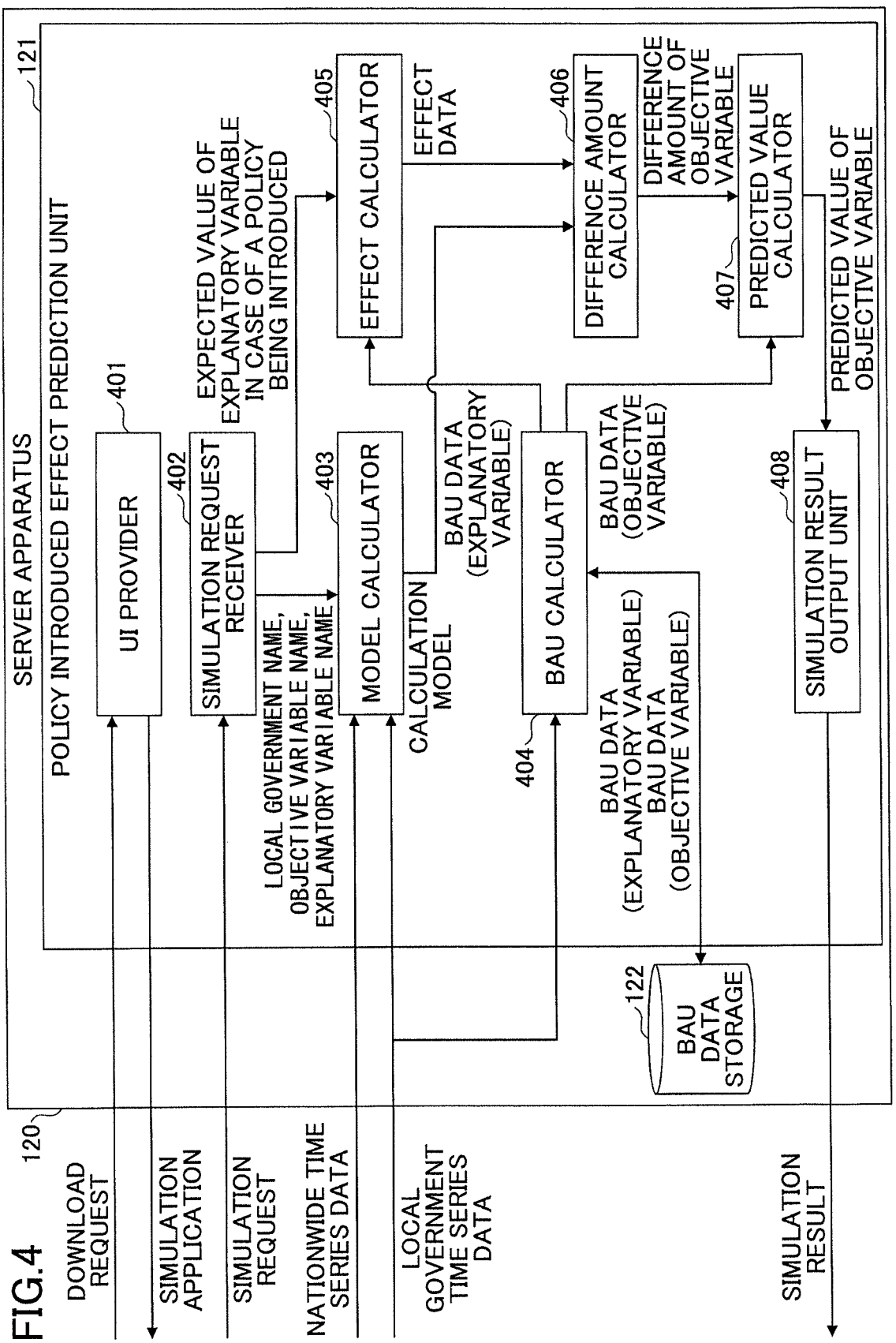
FIG. 4 is a diagram illustrating a functional configuration example of the server apparatus.

Next, a functional configuration of the embodiment will be described. FIG. 4 is a diagram illustrating a functional configuration example of the server apparatus.

As illustrated in FIG. 4, the policy introduced effect prediction unit 121 of the server apparatus 120 includes a UI provider 401, a simulation request receiver 402, a model calculator 403, and a BAU calculator 404. The policy introduced effect prediction unit 121 of the server apparatus 120 includes an effect calculator 405, a difference amount calculator 406, a predicted value calculator 407, and a simulation result output unit 408.

The UI provider 401 transmits a simulation application to the terminal 110 in response to the download request from the terminal 110.

In response to transmitting the simulation application to the terminal 110, the simulation request receiver 402 receives the simulation request transmitted from the terminal 110. In addition, the simulation request receiver 402 specifies a local government name, an objective variable name, and an explanatory variable name included in the simulation request, and reports the specified notifies the local government name, objective variable name, and explanatory variable name to the model calculator 403. In addition, the simulation request receiver 402 specifies a local government name, an objective variable name, and an explanatory variable name included in the simulation request, and reports the specified notifies the local government name, objective variable name, and explanatory variable name to the effect calculator 405.

The model calculator 403 acquires nationwide time series data corresponding to the reported objective variable name and explanatory variable name from the time series data storage device 130 to calculate difference data of the acquired nationwide time series data. Difference data is data obtained by calculating a difference (difference amount) in the time series data between each year and the following year. Based on the calculated difference data, the model calculator 403 analyzes a correlation between the objective variable and the explanatory variable, and determines whether there is a positive (+) correlation or a negative (−) correlation between the objective variable and the explanatory variable.

In addition, the model calculator 403 acquires the time series data of the local government according to the reported local government name, the objective variable name, and the explanatory variable name from the time series data storage device 130, and reports the acquired time series data of the local government to the BAU calculator 404.

Further, the model calculator 403 calculates the difference data from the acquired time series data of the local government, extracts the difference data corresponding to the determination result determined on the correlation to calculate a calculation model. Note that in a case where the model calculator 403 determines that there is a positive (+) correlation, the model calculator 403 calculates a calculation model by extracting the same sign data from the difference data, and in a case where the model calculator 403 determines that there is a negative (−) correlation, the model calculator 403 calculates a calculation model by extracting the different sign data.

As described above, the model calculator 403 calculates a calculation model based on the difference data calculated from the time series data of the objective variable and the difference data calculated from the time series data of the explanatory variable. As a result, the model calculator 403 may be enabled to calculate a calculation model illustrating a relationship between the difference in the explanatory variable and the difference in the objective variable.

The BAU calculator 404 performs regression analysis on the time series data of the local government reported from the model calculator 403. Further, the BAU calculator 404 calculates a predicted value of a future explanatory variable and a predicted value of the objective variable based on the result of the regression analysis. The predicted value of the explanatory variable calculated at this time is a predicted value of the explanatory variable in a case where the policy is not introduced, which is hereinafter referred to as "BAU data (explanatory variable)". Further, the predicted value of the objective variable calculated at this time is a predicted value of the objective variable in a case where the policy is not introduced, which is hereinafter referred to as "BAU data (objective variable)". Both BAU data (explanatory variable) and BAU data (objective variable) are examples of data obtained by regression analysis of previous time series data.

The effect calculator 405 calculates the difference (the difference in the explanatory variable) between the expected value of the explanatory variable in a case where the policy is introduced and the BAU data (explanatory variable) as effect data. As described above, since the BAU data (explanatory variable) is the predicted value of the explanatory variable in a case where the policy is not introduced, the effect data, which is the difference between the expected value of the explanatory variable in a case where the policy is introduced and the BAU data (explanatory variable), may represent a change in a social structure caused by the introduced policy.

The difference amount calculator 406 calculates the difference amount of the objective variable in a case where the policy is introduced by inputting the effect data calculated by the effect calculator 405 into the calculation model calculated by the model calculator 403.

The predicted value calculator 407 adds the difference amount of the objective variable calculated by the difference amount calculator 406 to the BAU data (objective variable) calculated by the BAU calculator 404, thereby calculating the objective variable in a case where the policy is introduced.

Accordingly, the predicted value calculator 407 calculates the predicted value of the objective variable by adding the difference amount of the objective variable calculated based on the effect data of the explanatory variable to the BAU data (objective variable). Accordingly, it is possible to calculate a predicted value reflecting a change in social structure (effect data) due to introduced policy, and to avoid a situation in which the predicted value of the objective variable deviates from the actual value. In addition, since the expected value of the explanatory variable in a case of introducing the policy is not directly input into a regression model to calculate the predicted value of the objective variable as in the related art technology, it is possible to avoid situations such as the predicted value of the objective variable becoming unstable due to the effect of multicollinearity.

That is, calculating the predicted value of the target variable performed by the predicted value calculator 407 may improve the prediction accuracy.

The simulation result output unit 408 transmits to the terminal 110 a simulation result calculated by the predicted value calculator 407 that includes the predicted value of the objective variable in a case where the policy is introduced.

Specific Process Example of Each Unit Included in Policy Introduced Effect Prediction Unit of Server Apparatus Next, a specific process example of each unit included in the policy introduced effect prediction unit 121 of the server apparatus 120 will be described.

(1) Specific Process Example of UI Provider

Figure 5:
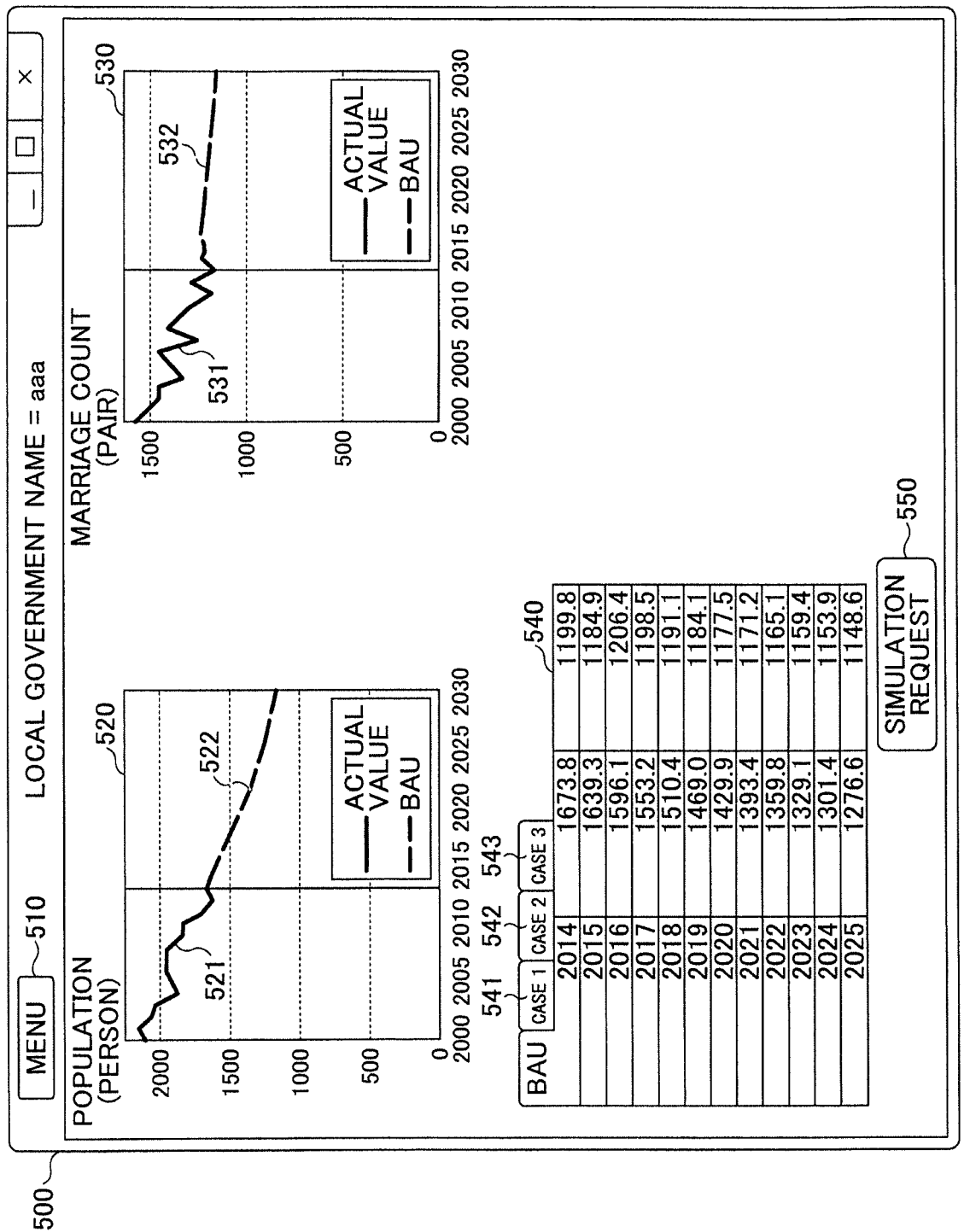
FIG. 5 is a diagram illustrating an example of a display screen displayed on a terminal by executing a simulation application provided by a UI provider.

FIG. 5 is a diagram illustrating an example of a display screen displayed on a terminal by executing a simulation application provided by a UI provider.

As illustrated in FIG. 5, the display screen 500 includes a menu button 510, which is displayed on the terminal 110 when a simulation application provided by the UI provider 401 is executed.

The user selects the menu button 510 to input the local government name, the objective variable name, and the explanatory variable name. FIG. 5 illustrates an example in which the user inputs the municipality name=aaa, the objective variable name=population, explanatory variable name=marriage count.

By receiving the local government name, the objective variable name, and the explanatory variable name, the simulation application reads the time series data 521 and 531 of the corresponding local government from the time series data storage device 130, and graphically displays the read time series data 521 and 531 in an objective variable display field 520 and an explanatory variable display field 530, respectively.

Note that the simulation application may calculate the BAU data (objective variable) 522 and the BAU data (explanatory variable) 532 by regression analysis of the time series data 521 and 531 of the local government. In this case, the simulation application graphically displays the calculated BAU data (objective variable) 522 and BAU data (explanatory variable) 532 in the objective variable display field 520 and the explanatory variable display field 530, respectively.

In the simulation application, a data value of the BAU data (objective variable) 522 and a data value of the BAU data (explanatory variable) 532 are displayed in a data value display field 540.

The data value display field 540 further includes an input field for the user to input the expected value of the explanatory variable in a case where the policy is introduced. In the case of FIG. 5, the user may be able to input up to three types of expected values of explanatory variables in each year in a case of introducing the policy by selecting one of tabs 541 to 543 of Case 1 to Case 3.

The display screen 500 further includes a simulation request button 550. When the user presses the simulation request button 550, the simulation application transmits to the server apparatus 120 a simulation request including details of the policy (the local government name, the objective variable name, the explanatory variable name, the expected value of the explanatory variable in a case of introducing the policy).

As described above, the user may easily make a simulation request simply by inputting the content of the policy via the display screen 500 of the terminal 110.

(2) Specific Process Example of Model Calculator

Figure 6:
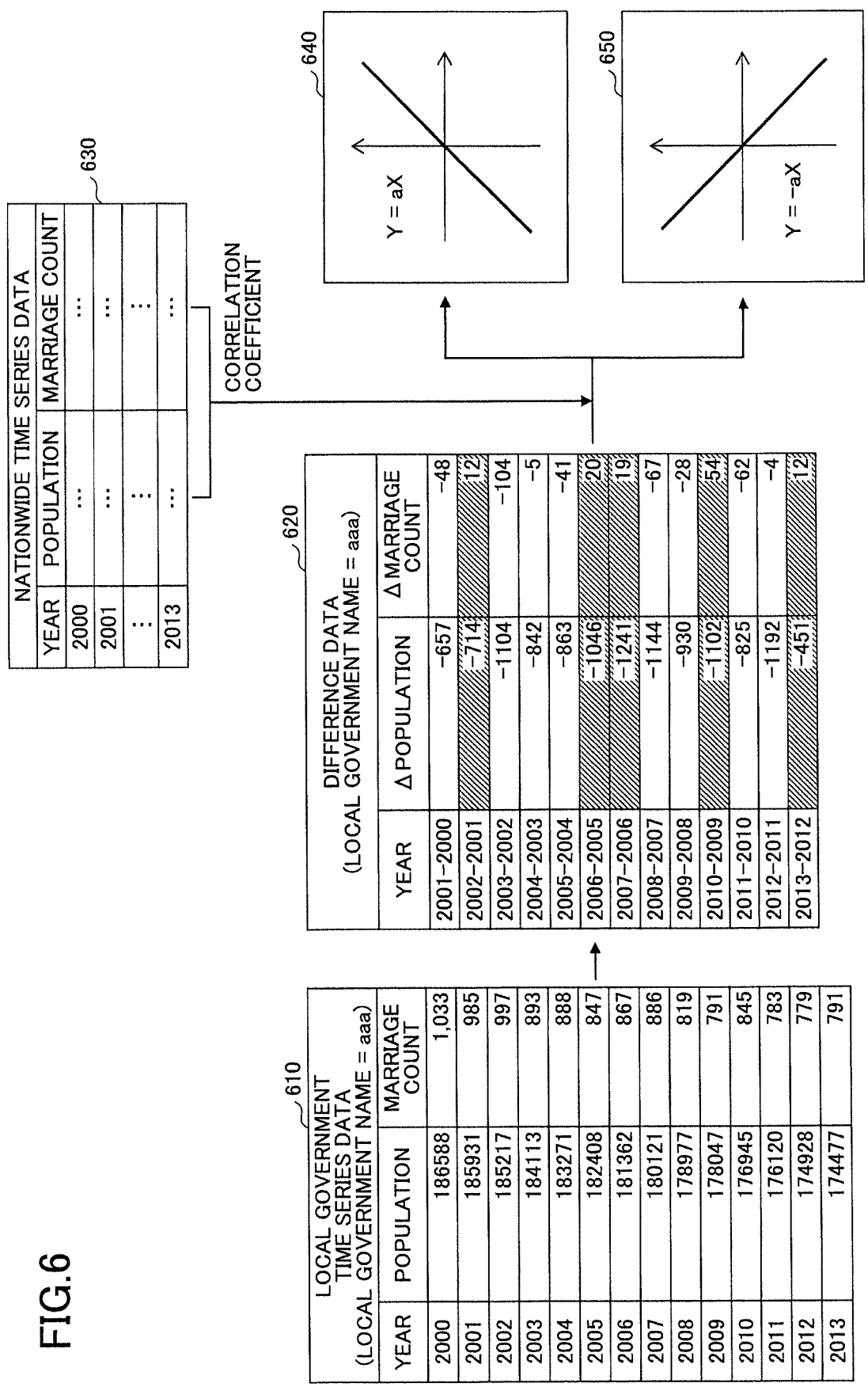
FIG. 6 is a diagram illustrating a specific process example of a model calculator according to a first embodiment.

FIG. 6 is a diagram illustrating a specific process example of a model calculator according to a first embodiment. In FIG. 6, the time series data 610 of the local government is time series data of the local government that is acquired by the model calculator 403 from the time series data storage device 130 according to the local government name, the objective variable name and the explanatory variable name included in the simulation request. The example of FIG. 6 illustrates that the simulation request includes the local government name="aaa", the objective variable name="population", and the explanatory variable name="marriage count". The example of FIG. 6 indicates that the time series data storage device 130 stores respective data of each year from 2000 to 2013 as the population data of local government name="aaa" and the marriage count.

As described above, by acquiring the time series data according to the policy content included in the simulation request, the server apparatus 120 may execute a policy introduced effect simulation process according to the policy content.

The model calculator 403 calculates the difference data 620 based on the acquired time series data 610 of the local government. The example of FIG. 6 indicates that the difference between the population data in 2001 and the population data in 2000 of the time series data 610 is calculated and the calculation result ("−657") is stored in association with the year="2001-2000". Further, the example of FIG. 6 indicates that the difference between the marriage count data in 2001 and the marriage count data in 2000 of the time series data 610 is calculated, and the calculation result ("−48") is stored in association with the year="2001-2000".

According to the time series data 610 of the local government, since both the population data and the marriage count data are decreasing from 2000 to 2001, any of the difference data recorded in association with the year="2001-2000" have a negative value. Accordingly, in a case where the sign of the difference data of the population data is the same as the sign of the difference data of the marriage count data (both being pluses or both being minuses), the model calculator 403 determines that the corresponding difference data as "difference data with same sign".

Further, the example of FIG. 6 indicates that the difference between the population data in 2002 and the population data in 2001 of the time series data 610 is calculated, and the calculation result ("−714") is stored in association with the year="2002-2001". Further, the example of FIG. 6 indicates that the difference between the population data in 2002 and the population data in 2001 of the time series data 610 is calculated, and the calculation result ("−714") is stored in association with the year="2002-2001".

According to the time series data 610 of the local government, the population data is decreasing from 2001 to 2002 such that the population data has a negative value; and the marriage count data is increasing such that the marriage count data has a positive value. Accordingly, in a case where the sign of the difference data of the population data differs from the sign of the difference data of the marriage count data (one being a plus and the other being a minus), the model calculator 403 determines that the corresponding difference data as "difference data with different signs".

The model calculator 403 calculates the difference data for each year="2001-2000" and "2013-2012", and determines whether each piece of difference data corresponds to the difference data with same sign, or corresponds to the difference data with different signs.

In FIG. 6, the nationwide time series data 630 is nationwide time series data with respect to the objective variable name="population" and explanatory variable name="marriage count". The model calculator 403 also calculates the difference data with respect to the time series data 630 nationwide and analyzes a correlation between the population data and the marriage count data. Accordingly, the model calculator 403 determines whether there is a positive (+) correlation or a negative (−) correlation between the population data and the marriage count data.

When the model calculator 403 determines that there is a positive (+) correlation, the model calculator 403 extracts the difference data with the same sign from among the difference data included in the difference data 620 to calculate a calculation model 640. Further, when the model calculator 403 determines that there is a negative (−) correlation, the model calculator 403 extracts the difference data with the different signs from among the difference data included in the difference data 620 to calculate a calculation model 650.

(3) Specific Process Example of BAU Calculator

FIG. 7 is a diagram illustrating a specific process example of a BAU calculator according to the first embodiment. As described above, the BAU calculator 404 calculates the BAU data (explanatory variable) and the BAU data (objective variable) and stores the calculated BAU data (explanatory variable) and BAU data (objective variable) in the regression analysis result data 700 of the BAU data storage 122 as illustrated in FIG. 7.

Specifically, the BAU calculator 404 calculates the BAU data (objective variable) and the BAU data (explanatory variable) by regression analysis of the time series data of the local government reported from the model calculator 403. Further, the BAU calculator 404 stores the calculated BAU data (objective variable) and the calculated BAU data (explanatory variable) in the item of "BAU data (objective variable)" and the item "BAU data (explanatory variable)" of the regression analysis result data 700, respectively.

(4) Specific Process Example of Effect Calculator

Figure 8:
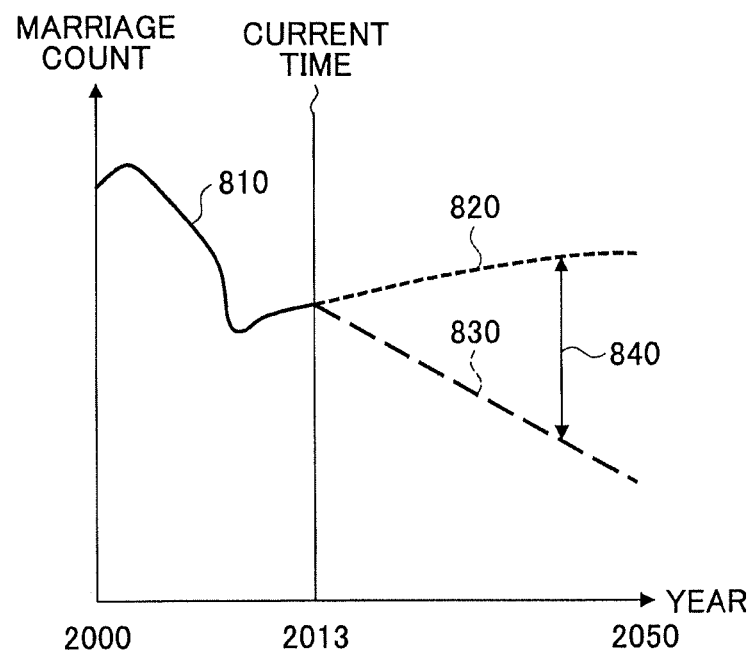
FIG. 8 is a diagram illustrating a specific process example of an effect calculator according to the first embodiment.

FIG. 8 is a diagram illustrating a specific process example of an effect calculator according to the first embodiment. In FIG. 8, a horizontal axis represents "year" and a vertical axis represents "marriage count".

In addition, in FIG. 8, the marriage count data 810 from 2000 to 2013 is graphed marriage count data associated with each of the years=2000 to 2013 of the time series data 610 of the local government.

In FIG. 8, the marriage count data 820 subsequent to the year 2013 indicates the expected value of the explanatory variable (the marriage count data) in a case of introducing the policy. As described above, the expected value of the explanatory variable (the marriage count data) in a case of introducing the policy is included in the simulation request transmitted from the terminal 110.

The effect calculator 405 acquires an expected value of the marriage count data in a case of introducing the policy, which is included in the simulation request, and graphs the acquired expected value as the marriage count data 820 from 2013 to 2050.

The effect calculator 405 reads from the regression analysis result data 700 the BAU data (explanatory variable) 830 from 2013 to 2050 acquired from the regression analysis of the marriage count data 810 from 2000 to 2013, and graphs the read BAU data (explanatory variable) 830 from 2013 to 2050. The BAU data (explanatory variable) 830 is a predicted value of the marriage count data in a case of the policy being not introduced.

The effect calculator 405 calculates the difference between the marriage count data 820 and the BAU data (explanatory variable) 830 for each year, and acquires the corresponding effect data 840.

In other words, the effect data 840 indicates the difference between the expected value of the marriage count data when the policy is introduced and the expected value of the marriage count data when the policy not introduced; that is, the effect data 840 indicates nothing but the difference amount of the explanatory variable according to the introduction of the policy.

Figure 9:
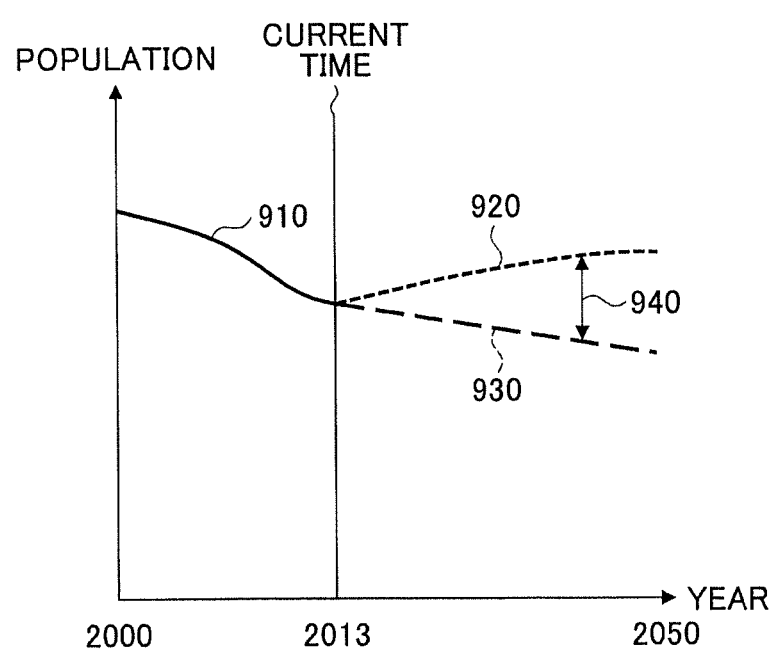
FIG. 9 is a diagram illustrating specific process examples of a difference amount calculator and a predicted value calculator according to the first embodiment.

(5) Specific Process Examples of Difference Amount Calculator and Predicted Value Calculator FIG. 9 is a diagram illustrating specific process examples of a difference amount calculator and a predicted value calculator according to the first embodiment. In FIG. 9, a horizontal axis represents "year" and a vertical axis represents "population".

In addition, in FIG. 9, the population data 910 from 2000 to 2013 is graphed population data associated with each of the years=2000 to 2013 of the time series data 610 of the local government.

The difference amount calculator 406 inputs the effect data 840 of each year obtained by the effect calculator 405 into the calculation model (any one of the calculation models 640 or 650) calculated by the model calculator 403. As a result, the difference amount calculator 406 calculates a difference amount 940 of the population data corresponding to the effect data 840 in each year from 2013 to 2050.

Further, the effect calculator 406 reads from the regression analysis result data 700 a BAU data (objective variable) 930 from 2013 to 2050 acquired from the regression analysis of the population data 910 from 2000 to 2013, and graphs the read BAU data (objective variable) 930 from 2013 to 2050. The BAU data (objective variable) 930 is a predicted value of the population data in a case of the policy being not introduced.

The predicted value calculator 407 calculates the predicted value (population data 920) of the population data in a case of introducing the policy by adding the difference amount 940 of the population data to the BAU data (objective variable) 930.

That is, the predicted value of the population data in a case of introducing the policy is the sum of the predicted value of population data in a case of the policy being not introduced and the difference amount of the population data for each year.

The simulation result output unit 408 transmits to the terminal 110 the predicted value (population data 920) of the objective variable from 2013 to 2050 as a simulation result.

(6) Specific Process Example of Simulation Result Output Unit

Figure 10:
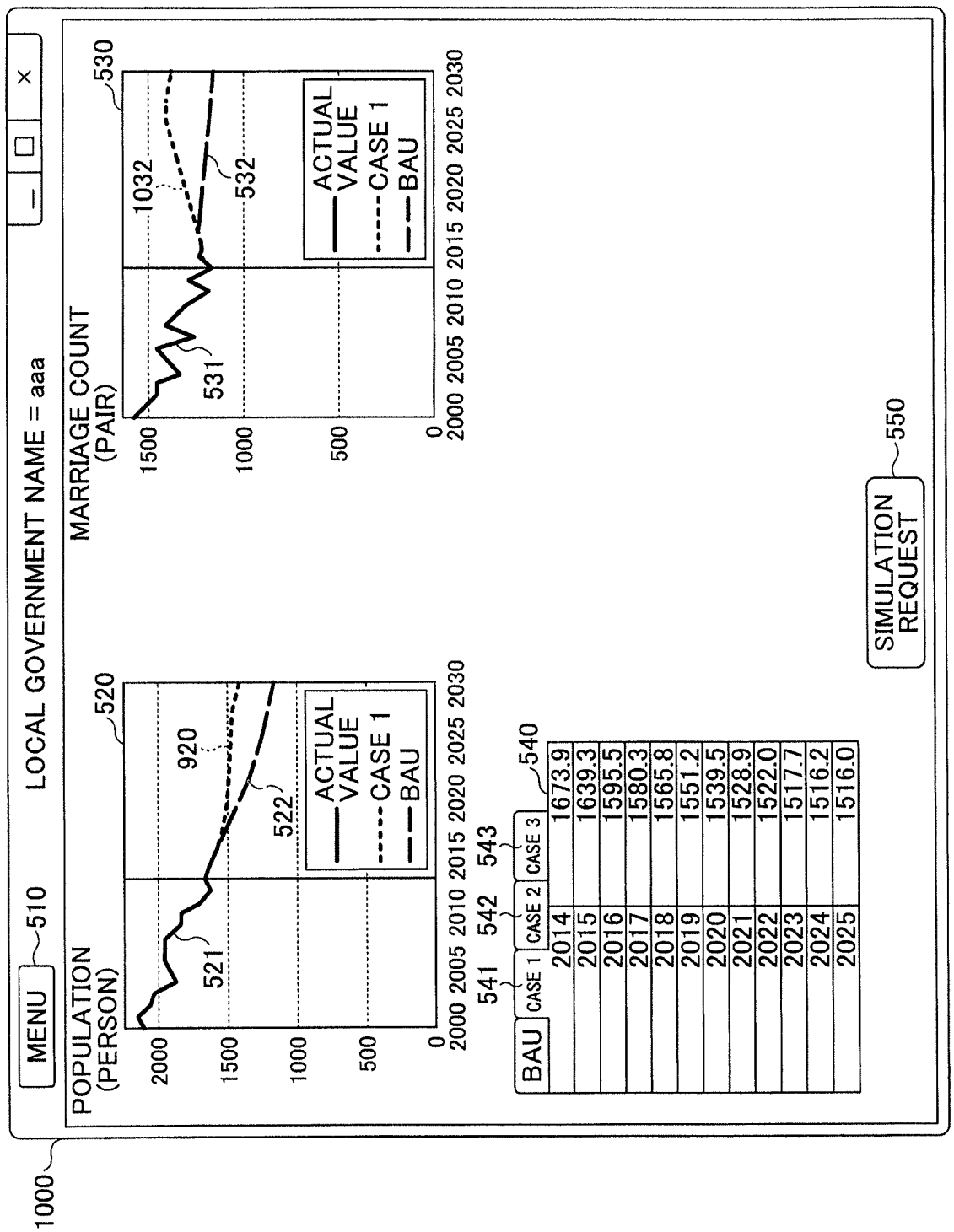
FIG. 10 is a diagram illustrating an example of a display screen displayed on a terminal by transmitting a simulation result by a simulation result output unit.

FIG. 10 is a diagram illustrating an example of a display screen displayed on a terminal by transmitting a simulation result by a simulation result output unit.

As illustrated in FIG. 10, the display screen 1000 includes an objective variable display field 520, an explanatory variable display field 530, and a data value display field 540 as output fields for outputting simulation results.

In the objective variable display field 520, a predicted value (population data 920) of the objective variable transmitted from the simulation result output unit 408 is graphically displayed. Further, in the explanatory variable display field 530, an expected value 1032 of an explanatory variable in a case of introducing the policy, which is included in the simulation request, is graphically displayed. Further, in the data value display field 540, the expected value of the explanatory variable in a case of introducing the policy, which is transmitted by being included in the simulation request (in the example of FIG. 10, by selecting the tab 541 of Case 1, the expected value of the explanatory variable input by the user), is displayed.

In this way, by displaying the simulation result on the display screen 1000 of the terminal 110, the user may be able to quantitatively recognize the effect of introducing policies.

Policy Introduced Effect Simulation Process Flow

Figure 11:
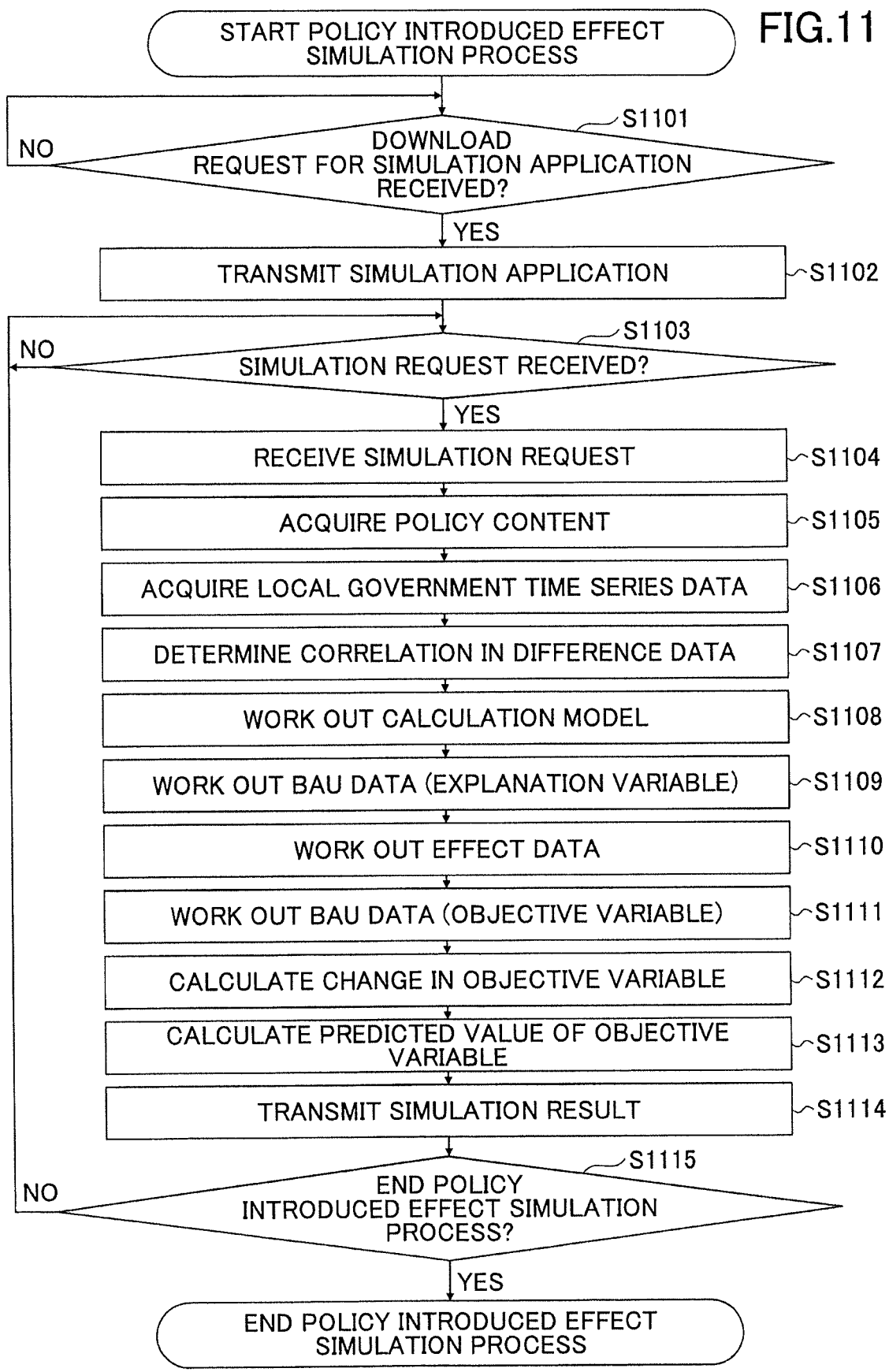
FIG. 11 is a flowchart of a policy introduced effect simulation process.

Next, a policy introduced effect simulation process flow executed by the policy introduced effect prediction unit 121 of the server apparatus 120 will be described. FIG. 11 is a flowchart of a policy introduced effect simulation process.

In step S1101, the UI provider 401 determines whether a simulation application download request has been received from the terminal 110. In step S1101, in a case where the UI provider 401 has determined that the UI provider 401 has not received the download request from the terminal 110 (in a case of "No" in step S1101), the UI provider 401 is in a standby mode until the UI provider 401 receives the download request.

In step S1101, in a case where the UI provider 401 has that the UI provider 401 has received the download request from the terminal 110 (in a case of "Yes" in step S1101), the process proceeds to step S1102.

In step S1102, the UI provider 401 transmits a simulation application to a request source terminal 110.

In step S1103, the simulation request receiver 402 determines whether the simulation request receiver 402 has received a simulation request from the terminal 110 that has started the simulation application. In step S1103, in a case where the simulation request receiver 402 determines that the simulation request receiver 402 has not received the simulation request (in the case of "No" in step S1103), the simulation request receiver 402 is in a standby mode until the simulation request receiver 402 receives the simulation request.

In step S1103, in a case where the simulation request receiver 402 determines that the simulation request receiver 402 has received the simulation request (in the case of "Yes" in step S1103), the process proceeds to step S1104.

In step S1104, the simulation request receiver 402 receives the simulation request transmitted from the terminal 110.

In step S1105, the simulation request receiver 402 acquires a policy content (local government name, objective variable name, explanatory variable name, expectation value of explanatory variable in case of introducing the policy) included in the simulation request.

In step S1106, the model calculator 403 acquires from the time series data storage device 130 time series data of the local government according to the local government name, the objective variable name, and the explanatory variable name acquired by the simulation request receiver 402. Further, the model calculator 403 calculates the difference data based on the acquired time series data, and determines whether the calculated difference data corresponds to difference data with the same sign or difference data with different signs.

In step S1107, the model calculator 403 acquires nationwide time series data corresponding to the objective variable name and explanatory variable name acquired by the simulation request receiver 402 from the time series data storage device 130 to calculate the difference data. Further, the model calculator 403 determines whether the difference data calculated based on the nationwide time series data has a positive (+) correlation or a negative (−) correlation between the objective variable and the explanatory variable.

In step S1108, the model calculator 403 calculates a calculation model. More specifically, in a case where the model calculator 403 has determined that there is a positive (+) correlation in step S1107, the model calculator 403 extracts the difference data with the same sign calculated based on the time series data of the local government to calculate a calculation model. In a case where the model calculator 403 has determined that there is a negative (−) correlation in step S1107, the model calculator 403 extracts the difference data with the different signs calculated based on the time series data of the local government to calculate a calculation model.

In step S1109, the BAU calculator 404 performs regression analysis on time series data of explanatory variables among time series data of the local government to calculate BAU data (explanatory variable).

In step S1110, the effect calculator 405 calculates the difference between the expected value of the explanatory variable in a case of introducing a policy included in the simulation request and the BAU data (explanatory variable) calculated in step S1109, thereby calculating the effect data.

In step S1111, the BAU calculator 404 performs regression analysis on time series data of objective variables among time series data of the local government to calculate BAU data (objective variable).

In step S1112, the difference amount calculator 406 calculates the difference amount of the objective variables in a case of introducing the policy by inputting the effect data calculated in step S1110 into the calculation model calculated in step S1108.

In step S1113, the difference amount calculator 406 adds the difference amount of the objective variables calculated in step S1112 to the BAU data (objective variable) calculated in step S1111, thereby calculating a predicted value of the objective variable in a case of introducing the policy.

In step S1114, the simulation result output unit 408 transmits the predicted value of the objective variable to the terminal 110 as a simulation result.

In step S1115, the UI provider 401 determines whether to end the policy introduced effect simulation process. For example, in a case of communication with the terminal 110 continues, the UI provider 401 determines in step S1115 that the policy introduced effect simulation process has not ended ("No" in step S1115), and the process returns to step S1103.

In a case of the communication with the terminal 110 ceases, the UI provider 401 determines in step S1115 that the policy introduced effect simulation process is to end ("Yes" in step S1115), and the policy introduced effect simulation process ends.

As should be apparent from the above description, in the server apparatus 120 according to the first embodiment, the model calculator calculates a calculation model based on the difference data calculated from the time series data of the objective variable and the difference data calculated the time series data of the explanatory variable.

As a result, the model calculating unit may be enabled to calculate a calculation model illustrating a relationship between the difference in the explanatory variable and the difference in the objective variable.

In addition, in the server apparatus 120 according to the first embodiment, the difference amount calculator inputs the effect data, which is calculated according to the expected value of the explanatory variable in a case of introducing the policy, into the calculation model to thereby calculate the amount of the change in the objective variable. Further, the predicted value calculator calculates a predicted value of the objective variable by adding the difference amount of the objective variable to the BAU data (objective variable).

As a result, the server apparatus 120 may calculate the predicted value reflecting the change (effective data) of the social structure as the predicted value of the objective variable owing to the introduced policy, enabling the server apparatus 120 to avoid a situation where the predicted value of the objective variable to be calculated deviates from the actual value. In addition, since the expected value of the explanatory variable in a case of introducing the policy is not directly input into a regression model to calculate the predicted value of the objective variable as in the related art technology, it is possible to avoid situations such as the predicted value of the objective variable becoming unstable due to the effect of multicollinearity.

As a result, according to the server apparatus of the first embodiment, it is possible to improve the prediction accuracy in a case of predicting the policy introduced effect.

Second Embodiment

In the first embodiment, the case where the predicted value of the objective variable is calculated using the time series data up to the current time (the year 2013) has been described. By contrast, in the second embodiment, the calculation of the predicted value of the objective variable and verification of the prediction accuracy of the calculated predicted value of the objective variable are performed using the time series data up to the current time (the year 2013) will be described.

Specifically, the second embodiment uses time series data of a local government, which is obtained by actually introducing a policy for increasing transferred inhabitants (e.g., expansion of residential areas by land development) thereby increasing its population.

In this case, the year (in this example, 2006) in which the policy is actually introduced is represented as a current time of performing a policy introduced effect simulation process. Then, the time series data of the explanatory variable up to the current time (the year 2006) of performing the policy introduced effect simulation process and the time series data of the explanatory variable after the current time (the year 2006) of performing the policy introduced effect simulation process are used to calculate the predicted value of the objective variable. Note that the time series data of the explanatory variables after the current time (the year 2006) in the policy introduced effect simulation process corresponds to the expected value of the explanatory variable in a case of introducing the policy.

Further, the time series data of the objective variable from the current time (the year 2006) of performing the policy introduced effect simulation process to the actual current time (the year 2013) is compared with the predicted value of the calculated objective variable to verify the prediction accuracy of the predicted value of the objective variable. Hereinafter, the second embodiment will be described in detail focusing on differences from the first embodiment.

(1) Specific Process Example of Model Calculator

Figure 12:
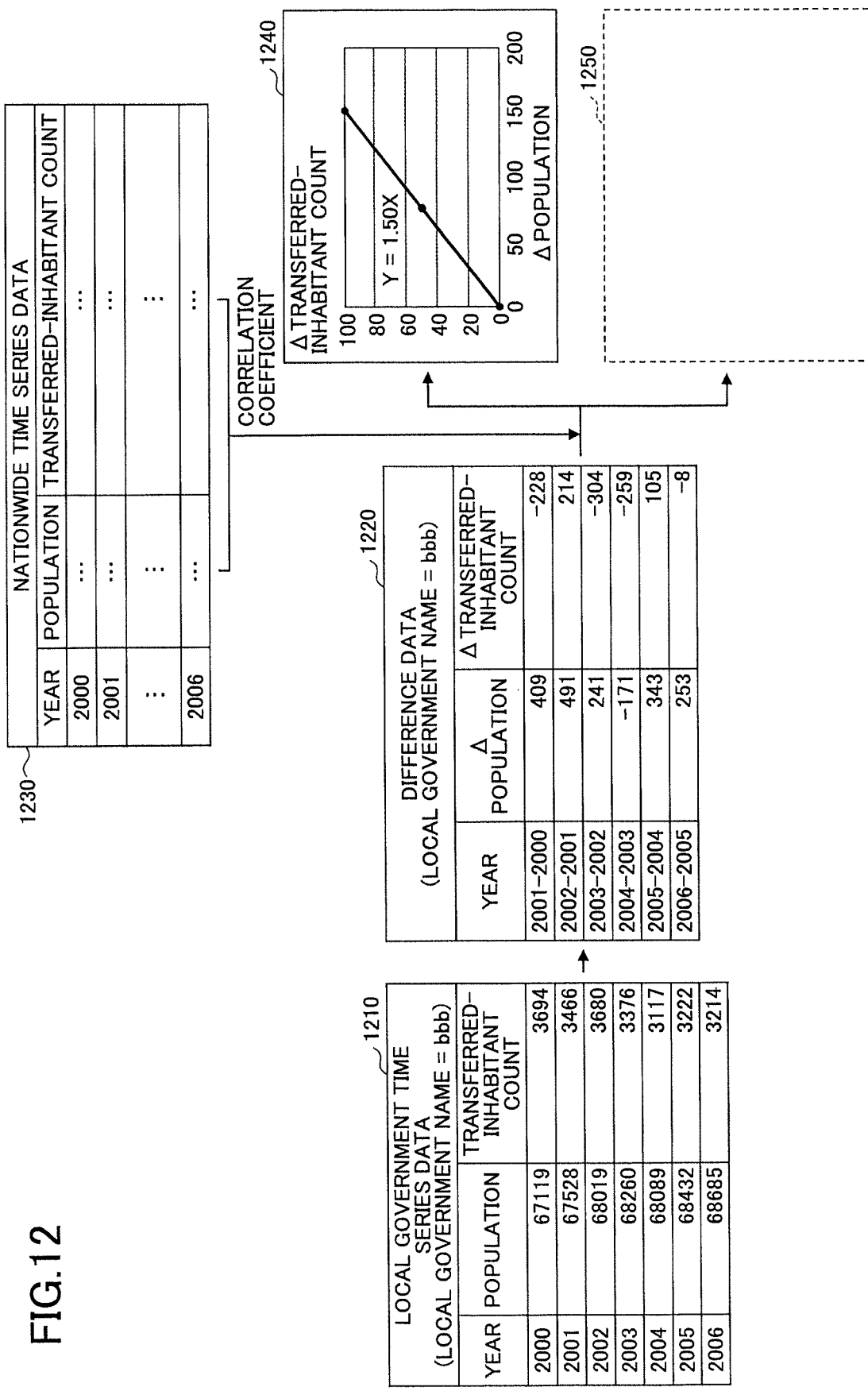
FIG. 12 is a diagram illustrating a specific process example of a model calculator according to a second embodiment.

FIG. 12 is a diagram illustrating a specific process example of a model calculator according to a second embodiment. In FIG. 12, the time series data 1210 of the local government is time series data of the local government that is acquired by the model calculator 403 from the time series data storage device 130 according to the local government name, the objective variable name and the explanatory variable name included in the simulation request. The example of FIG. 12 illustrates that the simulation request includes the local government name="bbb", the objective variable name="population", and the explanatory variable name="transferred-inhabitant count". The example of FIG. 12 indicates that the model calculator 403 retrieves the data of each year from the year 2000 to the year 2006, from among the data of each year from the year 2000 to the year 2013, as the population data of the local government name="bbb" and the transferred-inhabitant count data.

The model calculator 403 calculates the difference data 1220 based on the acquired time series data 1210 of the local government. The example of FIG. 12 indicates that the difference between the population data in 2001 and the population data in 2000 of the time series data 1210 is calculated and the calculation result (409") is stored in association with the year="2001-2000". Further, the example of FIG. 12 indicates that the difference between the transferred-inhabitant count data in 2001 and the transferred-inhabitant data in 2000 of the time series data 1210 is calculated, and the calculation result ("228") is stored in association with the year="2001-2000".

According to the time series data 1210 of the local government, the population data increases from 2000 to 2001 such that the population data is positive; however, the transferred-inhabitant count data decreases from 2000 to 2001 such that the transferred-inhabitant count data is negative. Accordingly, the model calculator 403 determines that the difference data from 2000 to 2001 is the difference data with different signs.

Further, the example of FIG. 12 indicates that the difference between the population data in 2002 and the population data in 2001 of the time series data 1210 is calculated, and the calculation result ("491") is stored in association with the year="2002-2001". Further, the example of FIG. 12 indicates that the difference between the transferred-inhabitant count data in 2002 and the transferred-inhabitant count data in 2001 of the time series data 1210 is calculated, and the calculation result ("214") is stored in association with the year="2002-2001".

According to the time series data 1210 of the local government, since both the population data and the transferred-inhabitant count data increases from the year 2001 to the year 2002, both data are positive values. Accordingly, the model calculator 403 determines that the difference data from the year 2000 to the year 2001 is the difference data with the same sign.

The model calculator 403 calculates the difference data for each year="2001-2000" and "2006-2005", and determines whether the difference data corresponds to the difference data with same sign, or corresponds to the difference data with different signs.

In FIG. 12, the nationwide time series data 1230 indicates nationwide time series data with respect to the objective variable name="population" and the explanatory variable name="transferred-inhabitant count". The model calculator 403 also calculates the difference data with respect to the nationwide time series data 1230 and analyzes a correlation between the population data and the transferred-inhabitant count data. Accordingly, the model calculator 403 determines whether there is a positive (+) correlation or a negative (−) correlation between the population data and the transferred-inhabitant count data.

The example of FIG. 12 illustrates a case where the model calculator 403 determines that there is a positive (+) correlation. Hence, the model calculator 403 extracts the difference data with the same sign from among the respective difference data included in the difference data 1220, and calculates the calculation model 1240 (i.e., the model calculator 403 does not calculate the calculation model 1250 based on the difference data with the different signs).

(2) Specific Process Example of Effect Calculator

FIG. 13 is a diagram illustrating a specific process example of an effect calculator according to the second embodiment. In FIG. 13, a horizontal axis represents "year" and a vertical axis represents "transferred-inhabitant count".

In addition, in FIG. 13, the transferred-inhabitant count data 1310 from 2000 to 2006 is graphed transferred-inhabitant count data associated with each of the years=2000 to 2006 of the time series data 1210 of the local government.

By contrast, in FIG. 13, the transferred-inhabitant count data 1320 after 2006 is graphed by inputting the transferred-inhabitant count data associated with the time series data of the local government in each of the years of 2006 to 2013 as an expected value of the explanatory variable (transferred-inhabitant count data) in a case of introducing the policy.

The effect calculator 405 reads from the regression analysis result data 700 the BAU data (explanatory variable) 1330 from 2006 to 2013 acquired from the regression analysis of the transferred-inhabitant count data 1310 from 2000 to 2006, and graphs the read BAU data (explanatory variable) 1330 from 2006 to 2013. The BAU data (explanatory variable) 1330 is a predicted value of the transferred-inhabitant count data in a case of the policy being not introduced.

The effect calculator 405 calculates the difference between the transferred-inhabitant count data 1320 and the BAU data (explanatory variable) 1330 for each year, and acquires the corresponding effect data 1340.

(3) Specific Process Examples of Difference Amount Calculator and Predicted Value Calculator FIG. 14 is a diagram illustrating specific process examples of a difference amount calculator and a predicted value calculator according to the second embodiment. In FIG. 14, a horizontal axis represents "year" and a vertical axis represents "population".

In addition, in FIG. 14, the population data 1410 from 2000 to 2006 is graphed population data associated with each of the years=2006 to 2013 of the time series data 1210 of the local government.

The difference amount calculator 406 inputs the effect data 1340 of each year obtained by the effect calculator 405 into the calculation model (the calculation model 1240) calculated by the model calculator 403. As a result, the difference amount calculator 406 calculates a difference amount 1440 of the population data corresponding to the effect data 1340 in each year from 2006 to 2013.

Further, the effect calculator 406 reads from the regression analysis result data 700 a BAU data (objective variable) 1430 from 2006 to 2013 acquired from the regression analysis of the population data 1410 from 2000 to 2006, and graphs the read BAU data (objective variable) 1430 from 2006 to 2013. The BAU data (objective variable) 1430 is a predicted value of the population data in a case of the policy being not introduced.

The predicted value calculator 407 calculates the predicted value (population data 1420) of the population data in a case of introducing the policy by adding the difference amount 1440 of the population data to the BAU data (objective variable) 1430.

Note that the population data 1450 is an actual measured value of population data in a case of introducing the policy, which is graphed population data associated with each of the years=2006 to 2016 of the time series data of the local government.

The prediction accuracy of the population data 1420 (predicted value) may be verified by comparing the population data 1420 (predicted value) with the population data 1450 (actual measured value). The example of FIG. 14 clearly illustrates that the population data 1420 (predicted value) exhibits a change similar to the change in the population data 1450 (actual measured value). Accordingly, the policy introduced effect simulation process performed by the server apparatus 120 exhibits generally satisfactory prediction accuracy in predicting the policy introduced effect.

As is apparent from the above description, the server apparatus 120 according to the second embodiment calculates the predicted value of the objective variable using the time series data of the local government that has actually introduced a policy, and compares the predicted value of the objective variable with the actual measured value of the objective variable.

Thus, according to the server apparatus of the second embodiment, it is possible to verify the prediction accuracy of the calculated predicted value of the objective variable.

Other Embodiments

In the first and second embodiments described above, the user inputs, as policy contents, the local government name, the objective variable name, the explanatory variable name, and the expected value of the explanatory variable in a case of introducing a policy. However, the policy contents input by the user are not limited to these factors (i.e., the local government name, the objective variable name, the explanatory variable name, and the expected value of the explanatory variable). The policy contents input by the user may be other information or the policy contents (e.g., the explanatory variable) may be automatically selected by the server apparatus 120 instead of being input by the user.

In the first and second embodiments described above, the policy introduced effect prediction system 100 includes one terminal 110; however, the number of the terminals in the policy introduced effect prediction system 100 is not limited to one terminal. The number of the terminals in the policy introduced effect prediction system 100 may be two or more. In this case, two or more terminals may be used by two or more users belonging to the same local government or by two or more users belonging to different local governments. That is, the server apparatus 120 may be installed separately for each local government in order to provide a policy introduced effect prediction service to two or more users of each local government. Alternatively, the server apparatus 120 may be arranged on the cloud, and the policy introduced effect prediction service may be provided to users of each of local governments.

In the first and second embodiments, the time series data storage device 130 stores time series data of a local government and nationwide time series data. However, these different time series data may be stored in different devices. Further, the server apparatus 120 may store time series data that is stored in the time series data storage device 130.

In the first and second embodiments, the server apparatus 120 calculates the BAU data (explanatory variable) and the BAU data (objective variable), and stores the calculated BAU data (explanatory variable) and BAU data (objective variable). However, the server apparatus 120 may acquire the BAU data (explanatory variable) and the BAU data (objective variable) calculated by other devices.

Further, in the first and second embodiments, one explanatory variable is selected; however, two or more explanatory variables may be selected.

According to the embodiments, it is possible to improve prediction accuracy in predicting an effect of introducing a policy.

It is to be noted that the present invention is not limited to the configurations described in the above embodiments, such as combinations with other elements, and the like. With respect to these points, alterations or modifications may be made within a scope of the claims in accordance with appropriately determined application forms without departing from the scope of the present invention.

All examples and conditional language recited herein are intended for illustrative purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that the various changes, substitutions, and alterations could be made hereto without departing from the spirit and scope of the invention.

What is claimed is:

1. A policy introduced effect prediction apparatus comprising:

a memory storing a set of instructions of a policy introduced effect prediction program; and one or more processors programed to execute the set of instructions to perform a policy introduced effect prediction process including:

receiving, from a terminal via a network, a simulation request, including an objective variable name, an explanatory variable name, and an expected value of an explanatory variable in response to introduction of a policy, which is input by a user on the terminal;

calculating at least one calculation model based on first difference data calculated based on time series data of an objective variable, which is a variable indicating an effect of introducing the policy, and second difference data calculated based on time series data of the explanatory variable, which is a variable highly related to the objective variable;

calculating a difference amount of the objective variable by inputting a difference amount of the explanatory variable for introducing the policy into the calculated calculation model;

calculating a predicted value of the objective variable in response to introduction of the policy by adding the calculated difference amount of the objective variable to a predicted value of the objective variable in the absence of introduction of the policy; and transmitting, to the terminal via the network, a simulation result including the predicted value of the objective variable in response to introduction of the policy, to display on the terminal a display screen representing a difference between the predicted value of the objective variable in the absence of introduction of the policy and the predicted value of the objective variable in response to introduction of the policy, and enable the user to quantitatively recognize the effect of introducing the policy, wherein the calculating of the at least one calculation model includes:

determining whether there is a positive correlation or a negative correlation between the first difference data calculated based on the time series data of the objective variable received from a storage device via the network and the second difference data calculated based on the time series data of the explanatory variable received from the storage device via the network;

in response to determining that there is a positive correlation between the first difference data and the second difference data, extracting difference data with same sign from among the first difference data and the second difference data and calculating a first calculation model having a positive correlation based on the extracted difference data with the same sign; and in response to determining that there is a negative correlation between the first difference data and the second difference data, extracting difference data with different signs from among the first difference data and the second difference data and calculating a second calculation model having a negative correlation based on the extracted difference data with the different signs.

2. The policy introduced effect prediction apparatus as claimed in claim 1, wherein the calculating of the at least one calculation model includes calculating any one of the calculation models including the first calculation model and the second calculation model, the first calculation model having the positive correlation between the first difference data calculated based on the time series data of the objective variable and the second difference data calculated based on the time series data of the explanatory variable, the second calculation model having the negative correlation between the first difference data calculated based on time series data of the objective variable and the second difference data calculated based on the time series data of the explanatory variable.

3. The policy introduced effect prediction apparatus as claimed in claim 2, wherein
in response to the first calculation model having the positive correlation, the first calculation model is calculated based on the first difference data and the second difference data with the same sign, and
in response to the second calculation model having the negative correlation, the second calculation model is calculated based on the first difference data and the second difference data with the different signs.

4. The policy introduced effect prediction apparatus as claimed in claim 1, wherein
the calculating of the difference amount of the objective variable includes calculating the difference amount of the explanatory variable in response to introduction of the policy, based on the difference between the predicted value of the explanatory variable in the absence of introduction of the policy and the expected value of the explanatory variable in response to introduction of the policy, the predicted value of the explanatory variable being obtained by regression analysis of the time series data of the explanatory variable.

5. The policy introduced effect prediction apparatus as claimed in claim 1, wherein
the predicted value of the objective variable in the absence of introduction of the policy is obtained by regression analysis of the time series data of the objective variable.

6. A non-transitory computer-readable recording medium having stored therein a program for causing a computer to perform a policy introduced effect prediction process comprising:
receiving, from a terminal via a network, a simulation request, including an objective variable name, an explanatory variable name, and an expected value of an explanatory variable in response to introduction of a policy, which is input by a user on the terminal;
calculating at least one calculation model based on first difference data calculated based on time series data of an objective variable, which is a variable indicating an effect of introducing the policy, and second difference data calculated based on time series data of the explanatory variable, which is a variable highly related to the objective variable;
calculating a difference amount of the objective variable by inputting a difference amount of the explanatory variable for introducing a policy into the calculated calculation model;
calculating a predicted value of the objective variable in response to introduction of the policy by adding the calculated difference amount of the objective variable to a predicted value of the objective variable in the absence of introduction of the policy; and
transmitting, to the terminal via the network, a simulation result including the predicted value of the objective variable in response to introduction of the policy, to display on the terminal a display screen representing a difference between the predicted value of the objective variable in the absence of introduction of the policy and the predicted value of the objective variable in response to introduction of the policy, and enable the user to quantitatively recognize the effect of introducing the policy,
wherein the calculating of the at least one calculation model includes:
determining whether there is a positive correlation or a negative correlation between the first difference data calculated based on the time series data of the objective variable received from a storage device via the network and the second difference data calculated based on the time series data of the explanatory variable received from the storage device via the network;
in response to determining that there is a positive correlation between the first difference data and the second difference data, extracting difference data with same sign from among the first difference data and the second difference data and calculating a first calculation model having a positive correlation based on the extracted difference data with the same sign; and
in response to determining that there is a negative correlation between the first difference data and the second difference data, extracting difference data with different signs from among the first difference data and the second difference data and calculating a second calculation model having a negative correlation based on the extracted difference data with the different signs.

7. A policy introduced effect prediction system comprising:
a policy introduced effect prediction apparatus;
a terminal configured to communicate with the policy introduced effect prediction apparatus; and
a storage device configured to store time series data, wherein
the policy introduced effect prediction apparatus includes a memory storing a set of instructions, and one or more processors programed to execute the set of instructions to perform a policy introduced effect prediction process including:
receiving, from a terminal via a network, a simulation request, including an objective variable name, an explanatory variable name, and an expected value of an explanatory variable in response to introduction of a policy, which is input by a user on the terminal;
calculating at least one calculation model based on first difference data calculated based on time series data of an objective variable, which is a variable indicating an effect of introducing the policy, and second difference data calculated based on time series data of the explanatory variable, which is a variable highly related to the objective variable;
calculating a difference amount of the objective variable by inputting a difference amount of the explanatory variable for introducing a policy into the calculated calculation model;
calculating a predicted value of the objective variable in response to introduction of the policy by adding the calculated difference amount of the objective variable to a predicted value of the objective variable in the absence of introduction of the policy; and
transmitting, to the terminal via the network, a simulation result including the predicted value of the objective variable in response to introduction of the policy, to display on the terminal a display screen representing a difference between the predicted value of the objective variable in the absence of introduction of the policy and the predicted value of the objective variable in response to introduction of the policy, and enable the user to quantitatively recognize the effect of introducing the policy, wherein the calculating of the at least one calculation model includes:

determining whether there is a positive correlation or a negative correlation between the first difference data calculated based on the time series data of the objective variable received from the storage device via the network and the second difference data calculated based on the time series data of the explanatory variable received from the storage device via the network;

in response to determining that there is a positive correlation between the first difference data and the second difference data, extracting difference data with same sign from among the first difference data and the second difference data and calculating a first calculation model having a positive correlation based on the extracted difference data with the same sign; and in response to determining that there is a negative correlation between the first difference data and the second difference data, extracting difference data with different signs from among the first difference data and the second difference data and calculating a second calculation model having a negative correlation based on the extracted difference data with the different signs.

8. The policy introduced effect prediction system as claimed in claim 7, wherein the terminal receives the predicted value of the objective variable in response to introduction of the policy included in the simulation result from the policy introduced effect prediction apparatus.

9. The policy introduced effect prediction system as claimed in claim 8, wherein the policy introduced effect prediction apparatus acquires time series data corresponding to the objective variable name from the storage device, the objective variable name being transmitted from the terminal.

\* \* \* \* \*